2,823,172
UREA SEPARATION PROCESS

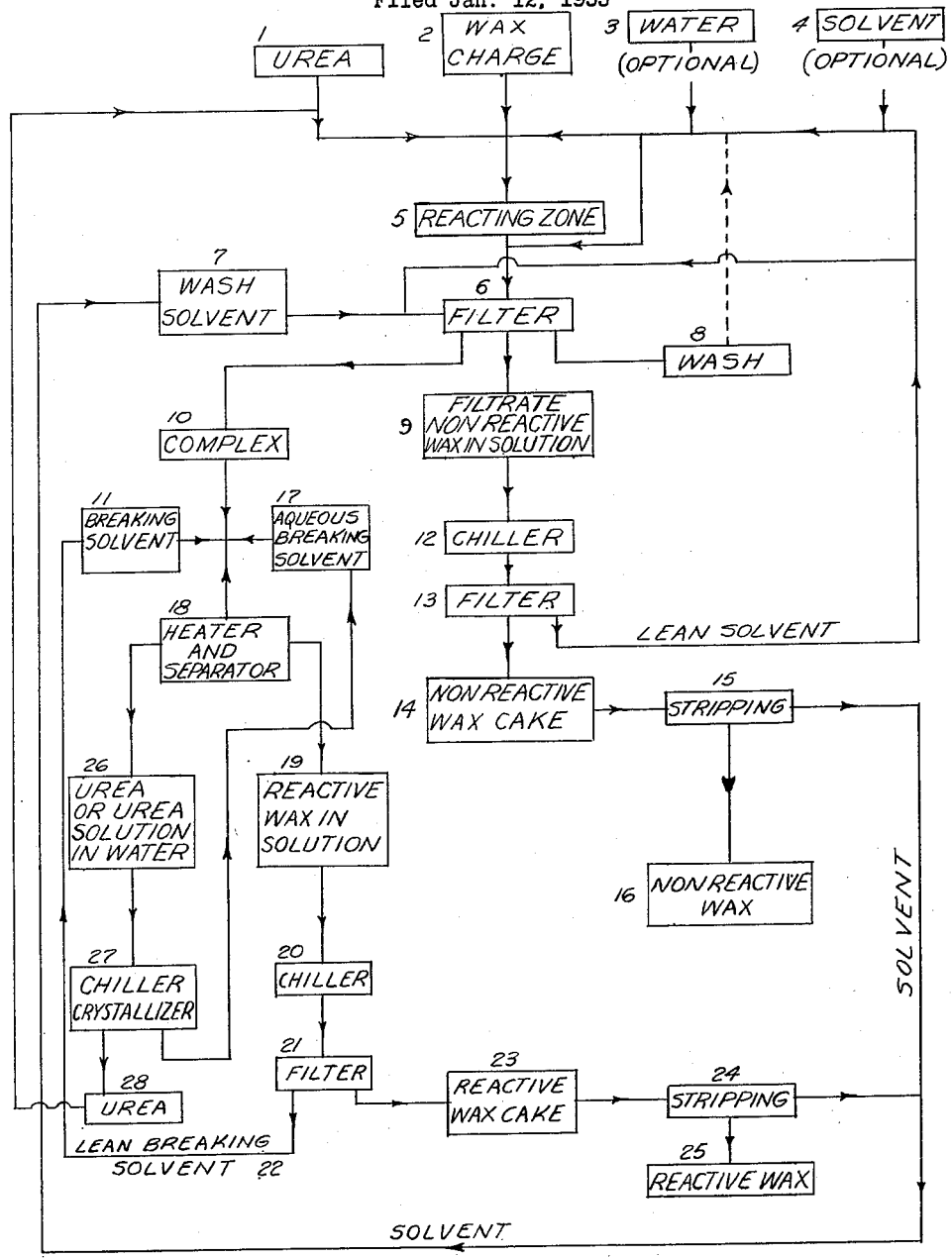

George Glen Rumberger and Frank Stanton Charlton, Neenah, Wis., assignors to Marathon Corporation, Menasha, Wis., a corporation of Wisconsin Application January 12, 1953, Serial No. 330,862

1 Claim. (Cl. 196—18)

This invention relates to an improved process for the separation of hydrocarbons. More specifically, this invention relates to an improvement in the process of separating solid hydrocarbons with urea.

An object of this invention is to provide an improvement in the process of forming and separating urea complexes formed by reaction of urea with solid hydrocarbon materials. A still further object is to provide a method whereby a minimum amount of solvent need be distilled in the process of forming urea complexes with these hydrocarbons and regenerating the hydrocarbons from the complexes so formed.

It is known that urea will react with paraffinic hydrocarbons to form a solid hydrocarbon complex. Advantage of this reaction has been taken to separate fractions from wax and other hydrocarbon mixtures, the reacting portions being essentially normal paraffinic in nature, and the non-reacting portions being of other than normal paraffinic structure, namely, solid isoparaffins, naphthenes and aromatics. Due to the fact that waxes are normally solid, it has been shown to be advantageous to use solvents as the diluting material, either in the reaction step, or after reaction has taken place, or in the breaking of the complex formed. The use of diluents in the reaction steps provides a mobile solution which can be advantageously contacted with urea, separated, washed, and further processed. The use of solvents for washing of the complex is obvious, as it removes any non-reactive portion occluded by the urea-hydrocarbon complex. It is often desirable to perform the breaking step either by heat or by contacting with urea solvent while the urea-hydrocarbon complex is suspended or dissolved in a solvent for hydrocarbons, and for this purpose the latter solvent acts to dissolve the wax or hydrocarbon released from the complex and form an immiscible layer which separates from the urea solution. Complexes may also be broken by heat in the presence of hydrocarbon solvents alone, and the urea separated as a molten or granular mass.

It is sometimes found advantageous to provide for dilution of the system with solvent at any or all of the three foregoing steps. It is obvious that if one or more of these dilutions are included in the process of forming, washing, and breaking urea-hydrocarbon complexes, a considerable amount of solvent is involved in the system. According to processes previously described, this requires the distillation and recovery of quite large amounts of solvent. By the use of our system the distillation and recovery of a greater portion of the solvent employed in the process is avoided, as the solvents are recycled into selected zones of the process, or the solvent is recovered by chilling the wax and solvent mixtures to precipitate the waxy hydrocarbon materials, thus recovering solvents substantially free from contamination wtih interfering materials.

The selection of solvents for our process is not critical as long as they meet the requirement of being liquid under temperature conditions which will be hereinafter described. It is preferable, however, that the solvents used be non-reactive with urea, or at least non-reactive with urea under conditions of the steps involved in contacting urea with the hydrocarbon mixture to be treated. Paraffinic naphthas can be used as long as the reaction steps are conducted at a temperature above which the ingredients of the naphtha will combine with the urea, but under conditions which cause desired components of the wax to react with urea. Normal hexane was found to be a satisfactory solvent for the process when the reaction step of our process was carried on at temperatures exceeding 100° F. It is preferred, however, that our process be carried out in the presence of solvents having complete compatibility with wax at elevated temperature, but limited solvency for wax at low temperatures.

We have found that the chlorinated solvents such as carbon tetrachloride, ethylene dichloride, trichloroethylene, tetrachloroethane, hexychloroethane, and chlorinated butenes to be ideal for practice of our separation process. Ethylene dichloride is especially advantageous. These chlorinated solvents have been found to contribute to rapid reaction of urea with wax, which is advantageous in the process. Furthermore, the solubility of wax in these solvents is great at elevated temperatures (above 130° F.), but wax is sparingly soluble in these solvents at temperatures below 75° F. The chlorinated solvents give freely filtering filter cakes of wax, and due to their high specific gravity, they separate well from water solutions of urea which makes it advantageous in the decanting of solutions of wax in these solvents from urea solutions.

Another class of solvent systems which we have found especially advantageous are mixtures of aromatic hydrocarbons with ketones. Specific examples of these are mixtures of methyl ethyl ketone and benzol, methyl isopropyl ketone and toluene, methyl ethyl ketone and toluene, or solvent compositions containing other combinations of the above solvents. In treating low melting waxes acetone mixtures may be used. When these solvents are contacted with aqueous urea solutions, we prefer to have the aqueous urea solutions saturated with the same solvent. When breaking methyl ethyl ketone-benzol suspensions of wax-urea complexes, it is preferred that the water or urea solutions used be first saturated with methyl ethyl ketone at the temperature of the breaking process. In this manner the composition of the solvent regenerated and returned to the system remains the same, and the addition of methyl ethyl ketone makeup to the system is avoided.

We have found that normal butanol, or butanol mixed with hydrocarbon solvents, is also advantageous in forming the wax solutions of our process. Although butanol is relatively soluble in water, we have found that this is no particular disadvantage, due to the fact that the urea reaction will proceed without addition of water, and the breaking step can be conducted by heating the urea complex so formed or by contacting with saturated aqueous solutions of butanol.

Other solvents such as petroleum naphthas may be used, but in general centrifugal separation of wax fractions from the solutions of non-reactive or reactive waxes is preferred where naphthas are used due to the low filtration rates generally encountered.

Our process can be broken down essentially into the following steps:

(1) Complex formation step.
(2) Complex isolation and washing step.
(3) Complex breaking step.
(4) Product and solvent recovery step.

In the complex forming step we may or may not use solvents. In the case of waxes, urea may be added to molten wax or molten wax added to urea, water added, and the reaction conducted in the molten mass. If desired, diluting solvents can be added to the wax before the introduction of urea into the system, and these solvents can be selected strictly for their dilution value, or for a promoting effect on the reaction. The choice of the points for introduction of the solvent will depend largely upon the amount of material to be removed, the speed of the reaction, or the mobility of the material which is desired in the processing steps. We have found it advantageous when separating wax fractions to add the solvent before introduction of the urea, but in some cases it is preferable to introduce the solvent in the system after the reaction has proceeded essentially completely. In other cases it is most desirable to eliminate solvent from the reaction step entirely, and to use solvent only for washing the complex after the separation step.

After formation of the urea-hydrocarbon complex it becomes necessary to remove the complexes formed from any unreactive material remaining. This can be accomplished by filtration, centrifugation, settling, or any other convenient means. After the separation process it is necessary to wash the complex with a solvent for the non-reactive material in order to remove said non-reactive material from the urea-wax complex. In washing the complex we have found it desirable, in order to minimize the amount of solvent required in the system, and to obviate excessive distillation, to wash the complex in a stepwise manner, adding and removing the wash solutions in a stepwise manner. After the complex has been washed, the wash liquor can be processed in several ways as will be described hereinafter.

After the filtration step, solvents will have occluded in the urea-wax complex mass. For the purpose of breaking the complex it is often advantageous to add more hydrocarbon solvent at this point. If the complex is to be broken by the addition of an excess of urea solvent to the system, the hydrocarbon solvent present is an aid in keeping the hydrocarbon in solution, and when the complex is to be broken by the application of heat the solvent serves as an efficient heat exchange medium as well as diluent. We have found that regardless of which method is chosen for breaking, advantage can be taken of the presence of the solvent in the steps of recovery of product and solvent which will be described hereinafter.

As stated hereinbefore, the object of our invention is to reduce the amount of evaporation and distillation necessary in the act of forming and separating urea-hydrocarbon complex wherein a solvent is employed in any of the process steps. In general, reduction of the amount of distillation necessary can be accomplished in the following ways:

(1) Recycling the wash liquor to the initial dilution step.

(2) Recycling lean wash liquor to the first washing step.

(3) Chilling the wash liquor to precipitate hydrocarbons, and after separation of the hydrocarbon, recycling the solvent to the washing step.

(4) Chilling the combined filtrate and wash liquors from the complex separation to obtain a solvent lean in hydrocarbon material, and recycling the solvent to the original dilution step.

(5) Chilling combined filtrate and filter wash from the complex separation step to precipitate hydrocarbon material, separating the hydrocarbon material from the lean solvent, and recycling the lean solvent to the filter washing step.

(6) Breaking the urea-hydrocarbon complex in the presence of a solvent material for the reactive hydrocarbon, separating the urea from the hydrocarbon solution, chilling the solution of hydrocarbon from said urea-wax complex to precipitate the hydrocarbon material, separating the said precipitated hydrocarbon material from the lean solvent and recycling the lean solvent thus obtained to any step of the process.

Steps 1 and 2 as shown above are used in the chemical and petroleum industries in solvent dewaxing, and solvent extraction. They are not an essential part of this process, as they are well known to those experienced in the art. Steps 3, 4, 5 and 6, however, are peculiar to the method of forming urea-wax complexes, and heretofore, advantage had not been taken of the steps as described in this invention. In order to successfully operate an economical process for the separation of wax by urea, the distillation of large volumes of solvent must be avoided. Heretofore, recovery of the desired fractions has been accomplished by distillation, and the amount of heat required in distilling these huge volumes of solvents has become so great that the process is uneconomical, and requires large amounts of distillation equipment. The process of the present invention eliminates the need for all but a minor amount of distillation equipment, with the added advantage that the wax fractions obtained need not be heated in distillation equipment over extended periods of time. Less discoloration or decomposition thereby results.

If it is desired to treat the wash material, filtrate, or hydrocarbon solution from the breaking step in order to obtain further fractionation, the chilling steps can be conducted in a stepwise manner so as to obtain incremental precipitation of the dissolved waxy hydrocarbon materials. In this way, it is possible to further fractionate the products obtained by the urea-hydrocarbon reaction process. This operation can be carried out either on solutions of the non-reactive product which are obtained from filter washing or the filtration step, or can be performed on a solution of reactive material which is obtained from the complex breaking step. When the hydrocarbon material in either the wash and filtrate solutions or in the urea reactive portion obtained in the breaking step is not a solid material, a solvent can be selected which is of limited miscibility with the hydrocarbon material at lowered temperatures, and thus separation can be afforded by this means. As an illustration of this, when methyl ethyl ketone is used as the solvent in the system, oily materials can be separated from either the reactive or non-reactive portions by chilling the methyl ethyl ketone solution of these to a temperature at which the methyl ethyl ketone is not entirely miscible with the oily hydrocarbon material. Thus, this process is of particular advantage when operating on waxes having a high oil content, as for example, up to 20%. In this case, the oily material is concentrated almost entirely in the non-reactive fraction and the washings obtained from the urea-hydrocarbon complex. When either the filtrate or washings, or a mixture of filtrate and washings are chilled they at first precipitate out wax. This is in the form of a solid material and can be easily removed by filtration, decantation or other means. After this separation step has been made the solvent solution can be further chilled and at some lower temperature, depending on the nature of the oil and the solvent selected, the oil separates in a separate phase and can thus be decanted in a gravity separator, centrifuge, or decanted in a continuous level controlled separating tower.

As an example of the operation of the prior art in similar processes, the following exemplifies the manner in which wash material is generally recirculated.

EXAMPLE 1

100 gm. of microcrystalline wax M. P. 190–195° F. (sold by Bareco Oil Co.) was dissolved in 600 ml. of 60/40 methyl ethyl ketone-benzol mixture and reacted with 300 gm. of urea and 10 ml. of water at a temperature of 160° F. Filtration gave 300 ml. of filtrate, 300 ml. being held by the cake, so 300 ml. of a 60/40 mixture of methyl ethyl ketone was passed through the filter as a displacement wash and the non-reactive wax recovered from the combined filtrate and displacement wash. The filter cake was then reslurried in 400 ml. of 60/40 methyl ethyl ketone-benzol and after heating to 160° F. the mass was filtered. The filtrate from this washing step was used as a portion of the dilution solvent for the second reaction of the series. This reaction was carried out exactly as described above and the wash liquors used as a portion of the solvent for a third reaction and so on.

In all, four reactions were run in this series. The yields of the urea reactive and non-reactive waxes are given in the following table:

*Table I*

| Run | Wax Charge, 190–195° F., Bareco Micro-Wax, gm. | Ml. of Wash | Yield Reactive Wax, gm. | Yield Non-Reactive Wax, gm. | Total Non-Reactive Wax Remaining in Wash Returned to Next Run, gm. |
|---|---|---|---|---|---|
| 1 | 100 | 400 | 68.8 | 24.7 | 6.5 |
| 2 | 100 | 400 | 68.5 | 28.5 | 9.5 |
| 3 | 100 | 400 | 70.0 | 31.1 | 8.4 |
| 4 | 100 | 400 | 69.0 | 29.1 | 10.3 |

As hereinbefore stated, recirculation of wash liquors in similar processes is old in the art. The table above shows that the amount of carry-over from the wash builds up continuously, and would eventually reach a point where wash filtrates could not be recirculated. This is due to the fact that none of the non-reactive wax contained in the wash liquors is released prior to recirculation.

As hereinbefore described, one embodiment of our invention consists of chilling the filtrate obtained from the complex separation and washing steps to release hydrocarbon material, and recycling the solvent mixture from this to one of the preceeding steps of the urea-hydrocarbon separation process. The following example will serve to illustrate how this is accomplished:

EXAMPLE 2

100 gm. of Bareco 190/95° F. micro-wax was dissolved in 600 ml. of a 60/40 mixture of methyl ethyl ketone (referred to as MEK) and benzol and reacted with 300 gm. of urea at 160° F. in the presence of 10 ml. of water. When the reaction had been completed, the mass was filtered and a displacement wash of 250 ml. of a 60% 40 mixture of methyl ethyl ketone and benzol were passed through the filter, providing a precipitate and a rich filtrate (1). The precipitate was then repulped in 400 ml. of a 60/40 MEK-benzol mixture and refiltered after heating to 160° F. to provide a washed complex filter cake and a lean filtrate (2). The complex (filter cake) was then removed from the system. The filtrates (1 and 2) containing the urea non-reactive wax were then combined and cooled to 45° F. thus precipitating urea non-reactive wax which was filtered off to give a wax cake and a filtrate relatively free of wax. 600 ml. of this filtrate was then used as solvent for the reaction of a second portion of 100 gm. of Bareco 190/95° F. micro-wax with urea and the balance used as the first wash on this reaction. This reaction was carried out in the same manner and the filtrate and washings, after chilling and filtration to remove non-reactive wax, were used as solvent in a third reaction, and so on. In all, five reactions were run in the series, and the results are summarized in the following table:

*Table II*

| Run | Wax Charge, 190/95° F., Bareco Micro-Wax, gm. | Total Wax Charge, gm. | Yield Reactive Wax, g. | Yield Non-Reactive Wax, g. | Loss in Process,[1] g. | Non-Reactive Wax and Oil in Filtrate Recycled to Next Run, gm. | Penetration of Non-Reactive Wax at 73° F. ASTM D5–25 |
|---|---|---|---|---|---|---|---|
| 1 | 100 | 100 | 67.7 | 27.9 | 2.5 | 1.9 | 5.5 |
| 2 | 100 | 101.9 | 69.8 | 23.0 | 2.5 | 6.6 | 5.8 |
| 3 | 100 | 106.6 | 72.3 | 22.0 | 2.5 | 9.8 | 4.3 |
| 4 | 100 | 109.8 | 66.6 | 25.1 | 2.5 | 15.6 | 4.3 |
| 5 | 100 | 115.6 | 70.3 | 27.9 | 2.5 | 14.9 | 7.9 |

[1] Assumed the average for the 5 runs.

As has been hereinbefore stated it sometimes becomes desirable to add solvents during the decomposition of the urea-hydrocarbon complex. The following example will serve to illustrate how advantage of solvent recovery by chilling is accomplished and how the solvent thus reclaimed can be returned to the process without distillation:

EXAMPLE 3

330 gm. of a mixture of urea and the urea adduct formed in treating 100 gm. of Quaker State Amber Micro-Wax M. P. 145/47° F. with 300 gm. of urea was heated at 180° F. with 400 ml. of benzol and 1,000 ml. of water until the complex was completely broken, the urea going into solution in the water, while the wax dissolved in the benzol. The two layers were separated. The benzol solution was diluted with sufficient methyl ethyl ketone (MEK) to make the solvent in the solution equal to a 60/40 MEK-benzol mixture, and the whole solution was then cooled to 45° F. The precipitated wax was filtered off (26.9 gm. of wax obtained) giving a wax cake and a filtrate. 150 ml. of this filtrate was used as the solvent for a reaction of 50 gm. of Quaker State Amber Micro-Wax M. P. 145/47° F. with 150 gm. of urea, in the presence of 2.5 ml. of water following the method as shown in Example 1. The yield of reactive wax from this reaction was 17.2 gm. or 34.4%.

As was stated hereinbefore, when water soluble solvents such as methyl ethyl ketone are used in the system, it is advantageous to break the complex by contacting with water saturated with the water soluble solvent. In Example 3 methyl ethyl ketone was not added until after the breaking step, so water could be used. In a second cycle of Example 3, the breaking step would have been conducted with water saturated with methyl ethyl ketone. In operating the process as in Example 3, if ethylene dichloride had been used, similar results would have been obtained, with the additional advantage that the wax solution would have separated as the bottom layer and could have been more easily withdrawn.

In addition to the recovery and recirculation of the hydrocarbon solvent by these means, we have found that it is often desirable to recover regenerated urea from the breaking step in the same manner. We have found that the amount of urea which will dissolve in water at low temperatures is much less than will dissolve at more elevated temperatures, and thus a specific embodiment of our process is in chilling to rewin urea from saturated or concentrated solutions obtained at higher temperatures. This operation makes the use of water in breaking the urea-hydrocarbon complex more practical, and lessens the necessity for evaporation of large amounts of water in the urea recovery process. We have found that in the breaking of complexes of urea and normally solid hydrocarbons it is advantageous to break the complex at relatively high temperatures. At times, when the melting point of the combined hydrocarbons is high, it has been found desirable to break the complex at temperatures approaching the boiling point of water. We have found that it is possible, after breaking of the urea-hydrocarbon complex with water at an elevated temperature, to chill the solution of urea thus obtained and crystallize out a greater portion of the urea in the solution. After separation of the crystallized urea, the water solution thus obtained, which still contains some urea in solution, is recycled to a succeeding breaking step.

In order to more fully understand the scope of our invention reference is now made to the accompanying drawing, wherein the figure is a diagrammatic flow chart illustrating our process.

It is to be understood that the steps herein described can be performed either as a continuous process, or in stepwise manner in batch process.

Referring specifically to the drawing, 1 represents a urea storage, and is used in the initiation of the process, and to replenish any urea lost in the process. After the process is in operation, regenerated urea can be drawn from stage 28 and may or may not be returned to the urea storage bin 1. Urea from 1 is contacted with the wax charged from source 2, and with or without water from source 3 as hereinbefore disclosed. When solvent is required in the initial reaction step, it is drawn from the source 4, or after the process is in full operation can be obtained by recirculation of the lean solvent from filter 13. Wash material can also be used as diluting solvent if desired from source 8 as shown in the drawing, as is well understood in the art. The charge mixture is then charged to a reacting zone 5 which can be an agitating vessel, or a continuous movement reactor provided with a scraping screw type conveyor, or other moving or mixing elements. After reaction is completed in 5, the reaction mixture is transferred to filter 6, and at this point more solvent can be introduced into the mixture, or in case the original charge has not been diluted with solvent, we prefer to add solvent and slurry it with the charge to the filter at this point. Element 6 may represent a drum filter, filter leaf, or any of the other conventional means of separating solids from liquids. We prefer to use a rotating drum type filter with provision for dividing the flow of filtrates and wash materials. After the urea complex has separated on the filter 6, it is washed with fresh solvent from point 7. Either all of the wash solvent can go into the filtrate 9, or the later portion of the wash material from the filter can be recycled to the charge as shown by the dotted line. The filtrate containing the non-reactive wax as in 9 is then chilled by chiller 12 and sent to a secondary filter 13 wherein the non-reactive wax cake is separated from lean solvent which is recycled to the charge or used as a primary wash on filter 6. The non-reactive wax from 14 is then sent to a stripping zone 15 where any solvent remaining in the wax cake is stripped off, the recovered solvent returning to wash solvent 7 and the recovered wax to storage or to further processing.

The washed complex from complex storage 10 is broken in a heater and separator 18 with the addition of a breaking solvent from tank 11 and aqueous breaking solution from tank 17. After heating to break the complex at 18, the urea solution settles out and is withdrawn to 26, and the solvent solution of reactive wax which is obtained is sent to surge tank 19, wherefrom it is run through a chiller to precipitate the wax, as in 20, and then to a secondary filter 21 wherein the reactive wax cake is separated from the breaking solvent, which is returned through line 22 to point 11. The reactive wax cake is discharged from filter 21 to storage tank 23 and is then stripped in stripping zone 24, the recovered solvent returning to wash solvent 7 and the reactive wax going to storage 25 or out for further processing. The urea solution obtained from heater and separator 18 is chilled in cooler and crystallizer 27 to crystallize urea, and the urea obtained from the crystallizer is then returned, optionally after drying, to urea storage 1 or to the reaction zone 5; the lean water solution being recycled to tank 17. The lean breaking solvent from filter 21 is recycled to tank 11.

After the process has once been set going, a material balance can be maintained by regulating the degree to which wash solvent goes into the filtrate comprising the non-reactive wax solution. Only sufficient urea and solvent to make up for losses need be added, and only sufficient water is added to the system to maintain the reaction of the urea with the hydrocarbon charge.

Due to the fact that our process operates on the principle of the relationship of temperature and solubility at various points of the process, there are certain limitations of temperature, concentration, and charge stock which must be maintained, and are hereinbelow set forth:

I. THE REACTION (A) *Charge wax.*—The charge wax may have a melting point of from about 120° F. to about 220° F. and should preferably contain from about 10% to about 90% by weight of material capable of reacting with urea. Not more than about 20% by weight of oily material (fluid at 90° F.) should be present in the charge stock.

(B) *Urea-water.*—The ratio of urea to change stock will vary with the amount of reactive material in the charge stock, but preferably should not be less than about ½ to 1 or greater than about 7 to 1 by weight. The amount of water based on the urea should be maintained from about ½% to 20% by weight of the urea. A notable exception is with butanol as solvent, wherein no water is necessary.

(C) *Solvent ratio.*—The reaction may be conducted with no solvent or with solvent present up to 10 parts of solvent per 1 part of charge by weight. At the point of complex separation, the ratio of solvent to charge should be adjusted to bring this ratio of solvent to total precipitated solids (urea and complex) to not less than 1 nor greater than 20 by weight. This may be accomplished by adjusting the amount of solvent present at the point of formation of the complex, or by adding solvent from storage, recycled wash, or recycled lean solvent obtained from chilling and filtering a solution of non-reactive wax.

(D) *Reaction temperature.*—The reaction of the wax and urea, with or without solvent, is conducted at a temperature above which any free wax precipitates, and will range from 115° F. to about 220° F. As the reaction is exothermic, sufficient heat may be removed to maintain the desired temperature.

II. SEPARATION OF COMPLEX AND TREATMENT OF FILTRATE (A) *Filtration to separate complex.*—The filtration should be conducted at a temperature high enough to prevent precipitation of any non-reacted wax preferably between 65° F. and 220° F., and the amount of wash solvent and solvent in the charge to the filter should be adjusted to give an effluent filtrate having from 3% to about 30% by weight of non-reactive wax and oil dissolved therein.

(B) *Separation of non-reactive wax from filtrate.*—The filtrate from A is chilled to a temperature sufficient to precipitate the major portion of the non-reactive wax and oil, suitably at a temperature of from −10° F. to about 150° F. The exact temperature depends on the solvent used and solubility of the non-reactive wax, but should be sufficiently low to leave in the solvent phase not more than 5% by weight of dissolved non-reactive wax and oil. After filtration in the above temperature range, the lean solvent for recycling will contain from about .02% to about 5% by weight of non-reactive wax and oil.

III. TREATMENT OF COMPLEX (A) *Breaking complex.*—The washed complex will contain some solvent, and we may add enough additional solvent to maintain the proper relation of complex and urea to solvent to maintain workability and hold the liberated reactive wax in solution throughout the breaking step. The ratio of solvent to free urea and complex combined should be in the ratio of about 0.3 to about 8 parts of solvent to 1 part of urea and complex by weight.

(B) *Aqueous breaking solution.*—The aqueous breaking solution will be saturated with the solvent of the process at the breaking temperature, which temperature will be from 115° F. to 220° F. The aqueous breaking solution will contain urea in the range of 0.2 to about 1.2 parts of urea to 1 part water by weight. In place of water, alcohols, glycols, or other strong urea solvents may be used.

(C) *Regenerating breaking solvent.*—After contacting the complex, aqueous breaking solution and solvent as above, the wax dissolved in the breaking solvent is separated, as by decantation, from the urea dissolved in the aqueous breaking solution. The solvent phase containing the wax must then be cooled to precipitate sufficient of the reactive wax to leave not more than 1 part of wax dissolved in 5 parts by weight of the breaking solvent. This requires cooling to a temperature below 115° F., preferably in the range of +20° F. to +80° F. The precipitated wax is filtered off by conventional means, and the filtrate containing less than 20% by weight of wax is recycled to the breaking solvent surge tank. Optionally this filtrate is recycled to the reaction zone as a diluent for new charge stock. The reactive wax cake from the filtration is stripped of solvent which is returned to wash solvent storage.

(D) *Regenerating solid urea and aqueous breaking solution.*—The aqueous solution of urea withdrawn in C is cooled to a temperature at least 40° F. lower than the breaking temperature to recrystallize out sufficient urea to give a mother liquor containing not more than 1.2 part of urea per part of water by weight, and this mother liquor is withdrawn and recycled to the aqueous breaking solution surge tank. The solid crystalline urea containing not excess of 20% water by weight is recycled to the reacting zone or urea storage suitably through a dryer.

Although the process set forth by example has used urea, thiourea may be used to form complexes in a similar manner, although some modification of temperatures and concentrations may be necessary.

In place of water in the reaction and breaking steps we may substitute alcohols or glycols, or aqueous mixtures of such as long as they are not soluble to any extent in the wax. Ethyl, methyl and isopropyl alcohol are suitable, as well as ethylene and propylene glycol.

We claim:

In a continuous process for treating waxes having a melting point of from 120° F. to about 220° F., said wax containing from 10% to 90% urea reactive wax and urea non-reactive oil not in excess of 20% by contacting said wax with urea in a reaction zone in the presence of methyl ethyl ketone at a temperature of from about 115° F. to about 220° F. to form a urea-wax complex and separating said complex from the resulting solution of oil and non-reactive wax, the improvement which comprises cooling said solution of oil and of non-reactive wax to a temperature sufficient to separate a solid phase consisting of non-reactive wax, separating said non-reactive wax, further cooling the solution remaining until a substantial amount of the urea non-reactive oil contained therein and methyl ethyl ketone separate as liquid phases, separating the methyl ethyl ketone from the oil and returning the methyl ethyl ketone to said reaction zone.

References Cited in the file of this patent

UNITED STATES PATENTS

| | | |
|---|---|---|
| 1,813,327 | Souther et al. | July 7, 1931 |
| 2,569,984 | Fetterly | Oct. 2, 1951 |
| 2,588,602 | Adams et al. | Mar. 11, 1952 |
| 2,642,377 | Fetterly | June 16, 1953 |